(12) United States Patent
Zhang et al.

(10) Patent No.: US 11,364,483 B2
(45) Date of Patent: Jun. 21, 2022

(54) METHOD FOR MAKING CATALYST FOR OZONE DECOMPOSITION

(71) Applicant: Tsinghua University, Beijing (CN)

(72) Inventors: Peng-Yi Zhang, Beijing (CN); Ran-Ran Cao, Beijing (CN); Yang Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 110 days.

(21) Appl. No.: 17/024,615

(22) Filed: Sep. 17, 2020

(65) Prior Publication Data
US 2021/0001310 A1 Jan. 7, 2021

Related U.S. Application Data

(63) Continuation of application No. PCT/CN2018/113074, filed on Oct. 31, 2018.

(30) Foreign Application Priority Data

Mar. 22, 2018 (CN) .......................... 201810241220.1

(51) Int. Cl.
B01D 53/86 (2006.01)
B01J 23/34 (2006.01)
(Continued)

(52) U.S. Cl.
CPC .......... B01J 23/34 (2013.01); B01D 53/8675 (2013.01); B01J 37/0236 (2013.01);
(Continued)

(58) Field of Classification Search
CPC .... B01D 2255/9205; B01D 2255/2073; B01D 53/8675; B01D 2258/06;
(Continued)

(56) References Cited

U.S. PATENT DOCUMENTS 1,602,404 A * 10/1926 Frazer ...................... B01J 23/34
423/246
4,871,709 A * 10/1989 Tatsushima .......... B01J 35/0026
502/324

(Continued)

FOREIGN PATENT DOCUMENTS

CN 103381363 11/2013
CN 103480267 1/2014
(Continued)

OTHER PUBLICATIONS

International Search Report of PCT/CN2018/113074, dated Jan. 2019.
(Continued)

Primary Examiner — Timothy C Vanoy

(57) ABSTRACT

A method for making a catalyst for ozone decomposition includes: adding a reducing agent into a water solution of a permanganate salt to obtain a first reaction liquid, and heating the first reaction liquid under continuous stirring to form a birnessite-type manganese dioxide; and adding the birnessite-type manganese dioxide into a water solution of an ammonium salt to obtain a second reaction liquid, and heating the second reaction liquid under continuous stirring to form the catalyst.

19 Claims, 7 Drawing Sheets

S1 — add a reducing agent into a water solution of a permanganate salt to obtain a first reaction liquid, and heat the first reaction liquid under continuous stirring to form a birnessite-type manganese dioxide S2 — add the birnessite-type manganese dioxide into a water solution of an ammonium salt to obtain a second reaction liquid, and heat the second reaction liquid under continuous stirring to form the catalyst

(51) Int. Cl.
*B01J 37/02* (2006.01)
*B01J 37/03* (2006.01)
*B01J 37/04* (2006.01)
*B01J 37/30* (2006.01)
*C01G 45/12* (2006.01)

(52) U.S. Cl.
CPC .............. *B01J 37/031* (2013.01); *B01J 37/04* (2013.01); *B01J 37/30* (2013.01); *C01G 45/1228* (2013.01); *B01D 2255/2073* (2013.01); *B01D 2257/106* (2013.01)

(58) Field of Classification Search
CPC ............ B01D 2255/9207; B01D 53/81; B01D 2255/2022; B01D 2255/2027; B01D 2257/106; B01J 37/031; B01J 37/30; B01J 35/0013; B01J 37/0236; B01J 23/34; B01J 37/08; B01J 37/04; B01J 35/002; B01J 37/16; C01P 2002/85; C01P 2006/16; C01P 2004/04; C01P 2002/72; C01P 2002/82; C01P 2006/14; C01P 2004/03; C01G 45/02; C01G 45/1228
See application file for complete search history.

(56) References Cited

U.S. PATENT DOCUMENTS

| | | | |
|---|---|---|---|
| 2004/0028575 | A1 | 2/2004 | Iimura et al. |
| 2007/0060472 | A1* | 3/2007 | Fisher .................... B01J 35/023 502/238 |
| 2021/0213155 | A1* | 7/2021 | Lee .................... B01D 53/8675 |

FOREIGN PATENT DOCUMENTS

| | | |
|---|---|---|
| CN | 104190251 | 12/2014 |
| CN | 105478106 | 4/2016 |
| CN | 106334557 | 1/2017 |
| CN | 108579729 | 9/2018 |

OTHER PUBLICATIONS

"Decomposition of high-level ozone under high humidity over Mn—Fe catalyst: The influence of iron precursors". Catalysis Communications, 2015, 59, 156-160.

"Decomposition of ozone using carbon-supported metal oxide catalysts". Applied Catalysis B: Environmental, 1997, 14(1-2), 117-129.

* cited by examiner

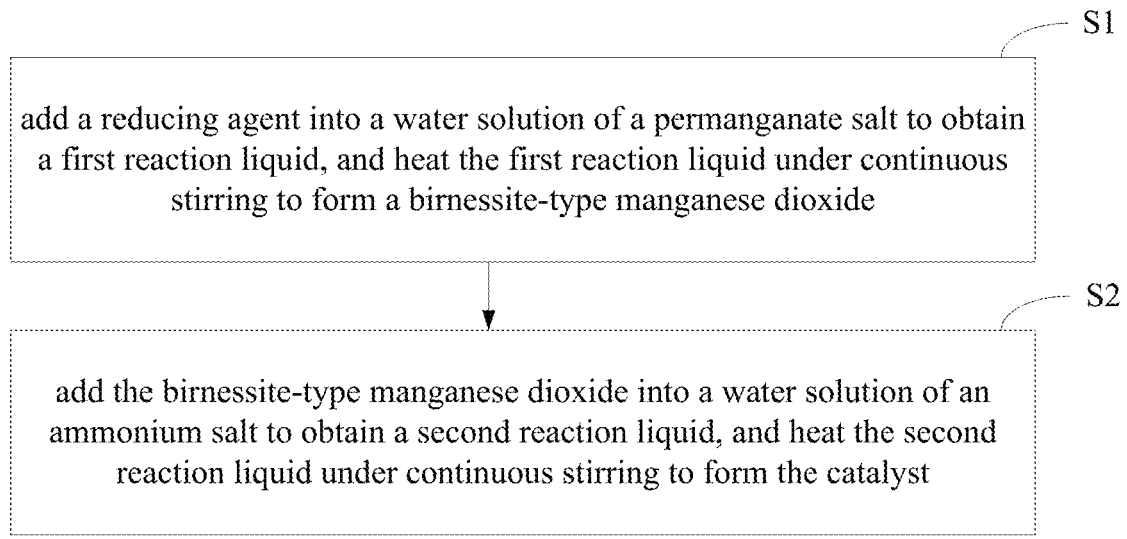
FIG. 1
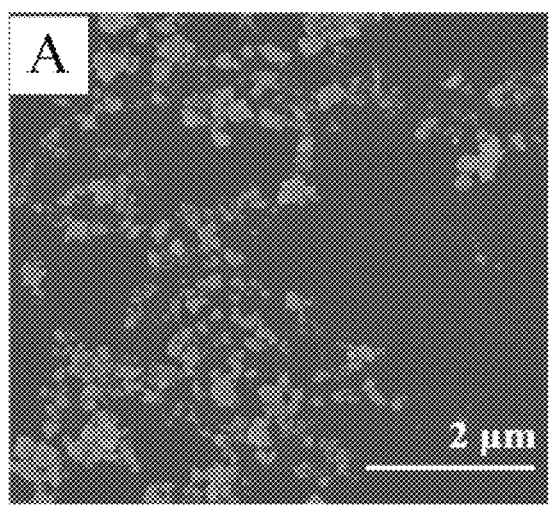 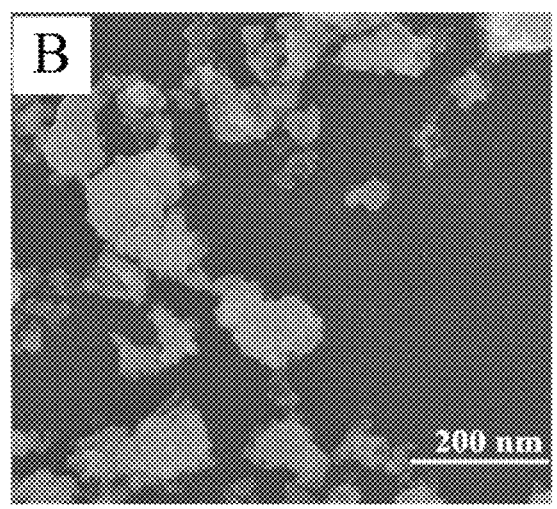
FIG. 2A  FIG. 2B

METHOD FOR MAKING CATALYST FOR OZONE DECOMPOSITION

CROSS-REFERENCE TO RELATED APPLICATIONS

This application claims all benefits accruing under 35 U.S.C. § 119 from China Patent Application No. 201810241220.1, filed on Mar. 22, 2018 in the China National Intellectual Property Administration, the content of which is hereby incorporated by reference. This application is a continuation under 35 U.S.C. § 120 of international patent application PCT/CN2018/113074, filed on Oct. 31, 2018, the content of which is also hereby incorporated by reference.

FIELD

The present disclosure relates to the field of catalysts, and in particular, to a method for making a catalyst for ozone decomposition.

BACKGROUND

Ozone is a common air pollutant. Long-term exposure to a low concentration of ozone can affect people's health. Ozone can be generated in offices having photocopiers and printers and in indoor spaces having electrostatic or ionized air purifiers. Therefore, there is a need to decrease the indoor ozone concentration.

The current methods for removing ozone include a thermal decomposition method, an active carbon adsorption method, a liquid adsorption method, and so on, which, however, generally have problems such as high energy consumption and secondary pollution. Catalytic decomposition at normal temperature is considered as one of the most promising ozone decomposition methods. The key point of the catalytic decomposition is the preparation of high performance catalysts. In practical application, the catalysts are mainly manganese oxide compounds which have relatively high activities. However, the manganese oxide compounds tend to lose the activities during the ozone decomposition processes due to, for example, the moisture presented in air, and thus, have short service lives in moist environments, which limits their applications.

SUMMARY

In view of the above, there is a need to provide a method for making a catalyst having a good catalytic stability even in a moist environment.

A method for making a catalyst includes: adding a reducing agent into a water solution of a permanganate salt to obtain a first reaction liquid, and heating the first reaction liquid under continuous stirring to form a birnessite-type manganese dioxide; and adding the birnessite-type manganese dioxide into a water solution of an ammonium salt to obtain a second reaction liquid, and heating the second reaction liquid under continuous stirring to form the catalyst.

In an embodiment, the ammonium salt is selected from the group consisting of ammonium sulfate, ammonium chloride, ammonium nitrate, ammonium carbonate, ammonium bicarbonate, and any combination thereof.

In an embodiment, a concentration of the ammonium salt in the water solution of the ammonium salt is about 5 g/L to about 400 g/L.

In an embodiment, a heating temperature of the first reaction liquid is about 25° C. to about 90° C.

In an embodiment, the permanganate slat is selected from the group consisting of potassium permanganate, sodium permanganate, ammonium permanganate, and any combination thereof.

In an embodiment, a concentration of the permanganate salt in the water solution of the permanganate salt is about 0.1 g/L to about 100 g/L.

In an embodiment, a mass ratio of the reducing agent to the permanganate is about 0.4 to about 15.

In an embodiment, the reducing agent is selected from the group consisting of methanol, ethanol, ethylene glycol, and any combination thereof.

In an embodiment, a heating temperature of the second reaction liquid is about 25° C. to about 90° C.

In an embodiment, the method further includes filtering, washing, and/or drying the birnessite-type manganese dioxide at least once after the heating the first reaction liquid under continuous stirring to form the birnessite-type manganese dioxide.

In an embodiment, the method further includes drying the catalyst at a temperature of about 60° C. to about 300° C. after the heating the second reaction liquid under continuous stirring to form the catalyst.

In an embodiment, the temperature of the drying is about 100° C. to about 150° C.

Another method for making a catalyst for ozone decomposition is further provided, including: adding an ammonium salt and a reducing agent into a water solution of a permanganate salt to obtain a mixed solution, and then heating the mixed solution under continuous stirring to obtain the catalyst.

In an embodiment, the method further includes drying the catalyst at a temperature of about 100° C. to about 150° C.

In the above-described embodiments of the method for making the catalyst for ozone decomposition, the birnessite-type manganese dioxide is modified with the ammonium salt. The obtained catalyst, i.e., the birnessite-type manganese dioxide modified with the ammonium salt, has an increased specific surface area, an increased number of oxygen vacancies at the surface, and an increased number of acid sites at the surface, thus having an increased catalytic activity. The obtained catalyst has an excellent catalytic effect on the ozone decomposition, even in a moist environment.

BRIEF DESCRIPTION OF THE DRAWINGS

FIG. 1 is a flow chart of a method for making a catalyst according to an embodiment of the present disclosure.

FIGS. 2A and 2B are scanning electron microscope images of a catalyst prepared in Example 1 at different magnifications.

DETAILED DESCRIPTION

Figure 2C:
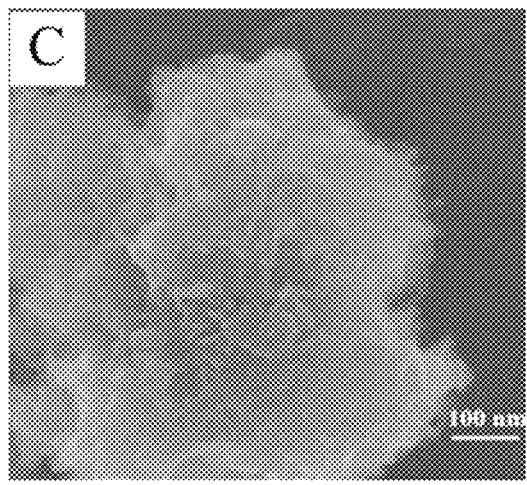
FIG. 2C is a scanning electron microscope image of a catalyst prepared in Example 2.

For a clear understanding of the technical features, objects and effects of the present disclosure, specific embodiments of the present disclosure will now be described in detail with reference to the accompanying drawings. It is to be understood that the following description is merely exemplary embodiment of the present disclosure, and is not intended to limit the scope of the present disclosure.

Use of ordinal terms such as "first", "second", "third", etc., to modify an element does not by itself connote any priority, precedence, or order of one element over another or the temporal order in which acts of a method are performed. Rather, unless specifically stated otherwise, such ordinal terms are used merely as labels to distinguish one element having a certain name from another element having a same name (but for use of the ordinal term).

For example, a "first reaction liquid" may be so named merely to distinguish it from, e.g., a "second reaction liquid". The mere usage of the ordinal numbers "first" and "second" before the term "reaction liquid" does not indicate any other relationship between the two reaction liquids, and likewise does not indicate any other characteristics of either or both reaction liquids.

Referring to FIG. 1, an embodiment of a method for making a catalyst capable of stably catalyzing the ozone decomposition even in a moist environment is provided in the present disclosure. The method includes steps of:

S1, adding a reducing agent into a water solution of a permanganate salt to obtain a first reaction liquid, and heating the first reaction liquid under continuous stirring to form a birnessite-type manganese dioxide; and S2, adding the birnessite-type manganese dioxide into a water solution of an ammonium salt to obtain a second reaction liquid, and heating the second reaction liquid under continuous stirring to form the catalyst.

In the method for making the catalyst for the ozone decomposition, the birnessite-type manganese dioxide is modified with the ammonium salt. Since the $NH_4^+$ ions in the second reaction liquid can break the structure of the birnessite-type manganese dioxide to some extent, the modified birnessite-type manganese dioxide (i.e., the catalyst) has an increased specific surface area, an increased number of oxygen vacancies at the surface, and an increased number of acid sites at the surface. Consequently, the catalytic activity of the catalyst is increased. The obtained catalyst has an excellent catalytic effect on the ozone decomposition, even in a moist environment. Moreover, a high temperature and a high pressure are not required in the method, thus simplifying the making process and reducing the cost.

In S1, the permanganate salt can be selected from the group consisting of potassium permanganate, sodium permanganate, ammonium permanganate, and any combination thereof. A concentration of the permanganate salt in the water solution of the permanganate salt can be about 0.1 g/L to about 100 g/L. The reducing agent can reduce the permanganate salt to manganese oxide. The reducing agent can be selected from the group consisting of methanol, ethanol, ethylene glycol, and any combination thereof. A mass ratio of the reducing agent to the permanganate salt can be about 0.4 to about 15. The heating in S1 can be performed in a water bath. A heating temperature of the first reaction liquid can be about 25° C. to about 90° C., for example, about 40° C. to about 80° C., to ensure that no decomposition of the permanganate salt can occur in the heating step in S1. A content of the solid birnessite-type manganese dioxide in the reaction system after completion of S1 can be about 40 g/L to about 60 g/L. S1 can be performed at a normal pressure.

After S1, the method can further include filtering, washing, and/or drying the birnessite-type manganese dioxide to remove the solvent and/or the reducing agent retained on the birnessite-type manganese dioxide.

In S2, the heating can be performed in a water bath to uniformly heat the second reaction liquid to allow $NH_4^+$ ions to be well adsorbed onto the birnessite-type manganese dioxide. A heating temperature of the second reaction liquid can be about 25° C. to about 90° C., for example, about 30° C. to about 80° C., to ensure that no decomposition of the ammonium salt can occur in the heating step in S2. A concentration of the ammonium salt in the water solution of the ammonium salt can be about 5 g/L to about 400 g/L, for example, about 5 g/L to about 130 g/L. The ammonium salt can be selected from the group consisting of ammonium sulfate, ammonium chloride, ammonium nitrate, ammonium carbonate, ammonium bicarbonate, and any combination thereof.

After S2, the method can further include a step of drying the catalyst by heating. When the catalyst is dried by heating, some of the $NH_4^+$ ions on the catalyst are converted into ammonia gas. The layered structures of the birnessite-type manganese dioxide can be spread apart from each other by the ammonia gas, causing the specific surface area of the catalyst to be further increased. As the specific surface area of the catalyst increases, the number of exposed active sites per unit volume of the catalyst increases. Thus, the catalytic activity of the catalyst is further increased. However, if a drying temperature is higher than 300° C., the crystal form of the manganese dioxide may be changed. Therefore, the temperature of drying the catalyst obtained in the S2 can be about 60° C. to about 300° C., for example, about 100° C. to about 150° C. In this temperature range, the dried catalyst can have a relatively large specific surface area and an excellent catalytic activity. S2 can be performed at a normal pressure.

Another embodiment of the method for making the catalyst for ozone decomposition is provided in the present disclosure. The method includes steps of:

adding the ammonium salt and the reducing agent into the water solution of the permanganate salt, and then heating under continuous stirring to obtain the catalyst.

In this embodiment of the method, the ammonium salt is directly mixed with the reducing agent and the water solution of the permanganate salt. $NH_4+$ ions can be adsorbed onto the birnessite-type manganese dioxide in the generation of the birnessite-type manganese dioxide. The heating can be performed for only one time to obtain the catalyst having the high catalytic effect on the ozone decomposition and the good moisture resistant property. Other conditions and steps are substantially the same as the corresponding conditions and steps in the above-described embodiment of the method. For example, the method can further include the step of drying the catalyst by heating.

Example 1

3 g of $KMnO_4$ is added into a 250 mL conical flask. 100 mL of deionized water is further added into the conical flask.

Then the conical flask is placed into a water bath at a constant temperature of 40° C. while the substances in the conical flask are subjected to a magnetic stirring. After the $KMnO_4$ solid is completely dissolved, 15 g of $CH_3OH$ is added into the conical flask, and then the magnetic stirring is continued for 6 hours. When the reaction is finished, the mixture in the conical flask is filtered, washed with deionized water, and then filtered again to obtain a solid product. The cleaned solid product is dried in an oven at 105° C. for 12 hours, thereby obtaining a dried birnessite-type manganese dioxide.

2 g of the dried birnessite-type manganese dioxide is added into a 100 mL beaker. 40 mL of $NH_4Cl$ solution having a concentration of 15 g/L is further added into the beaker. Then the beaker is placed into a water bath at a constant temperature of 30° C., and the mixture in the beaker is subjected to a magnetic stirring for 3 hours. When the reaction is finished, the mixture in the beaker is filtered and washed with deionized water to obtain a product. The cleaned product is dried in an oven at 105° C. for 12 hours, thereby obtaining the catalyst.

Element analysis is performed on the catalyst prepared in Example 1. Contents of elements Mn and K (the element K is in the form of $K^+$ ions intercalated between layers of the structure of the birnessite-type manganese dioxide) in the catalyst are calculated. It is found that the content of $K^+$ in the birnessite-type manganese dioxide is 14.55% before the modification and is 2.07% after the modification, suggesting a majority of the intercalated $K^+$ ions are substituted by $NH_4^+$ ions presented in the solution. The ion exchange occurred between the layers of the structure of the birnessite-type manganese dioxide breaks the layers to some extent. Consequently, a specific surface area of the catalyst obtained after the modification is increased as compared to the birnessite-type manganese dioxide before the modification.

Example 2

3 g of $NaMnO_4$ is added into a 250 mL conical flask. 50 mL of deionized water is further added into the conical flask. Then the conical flask is placed into a water bath at a constant temperature of 60° C. while the substances in the conical flask are subjected to a magnetic stirring. After the $NaMnO_4$ solid is completely dissolved, 30 g of $CH_3CH_2OH$ is added into the conical flask, and then the magnetic stirring is continued for 12 hours. When the reaction is finished, the mixture in the conical flask is filtered, washed with deionized water, and then filtered again to obtain a solid product. The cleaned solid product is dried in an oven at 105° C. for 12 hours, thereby obtaining a dried birnessite-type manganese dioxide.

2 g of the dried birnessite-type manganese dioxide is added into a 100 mL beaker. 40 mL of $(NH_4)_2SO_4$ solution having a concentration of 60 g/L is further added into the beaker. Then the beaker is placed into a water bath at a constant temperature of 50° C., and the mixture in the beaker is subjected to a magnetic stirring for 8 hours. When the reaction is finished, the mixture in the beaker is filtered and washed with deionized water to obtain a product. The cleaned product is dried in an oven at 105° C. for 12 hours, thereby obtaining the catalyst.

$N_2$ adsorption isotherm of the catalyst prepared in Example 2 is obtained at 77 K. According to the $N_2$ adsorption isotherm, the BET specific surface area, the pore size, and the pore volume of the catalyst are calculated. The BET specific surface area of the catalyst is 221 $m^2 \cdot g^{-1}$, the pore size of the catalyst is 6.09 nm, and the pore volume of the catalyst is 0.39 $cc \cdot g^{-1}$.

Example 3

3 g of $NH_4MnO_4$ is added into a 250 mL conical flask. 30 mL of deionized water is further added into the conical flask. Then the conical flask is placed into a water bath at a constant temperature of 80° C., while the substances in the conical flask are subjected to a magnetic stirring. After the $NH_4MnO_4$ solid is completely dissolved, 45 g of $CH_3OH$ is added into the conical flask, and then the magnetic stirring is continued for 24 hours. When the reaction is finished, the mixture in the conical flask is filtered, washed with deionized water, and then filtered again to obtain a solid product. The cleaned solid product is dried in an oven at 105° C. for 12 hours, thereby obtaining a dried birnessite-type manganese dioxide.

2 g of the dried birnessite-type manganese dioxide is added into a 100 mL beaker. 40 mL of $(NH_4)_2SO_4$ solution having a concentration of 80 g/L is further added into the beaker. Then the beaker is placed into a water bath at a constant temperature of 70° C., and the mixture in the beaker is subjected to a magnetic stirring for 15 hours. When the reaction is finished, the mixture in the beaker is filtered and washed with deionized water to obtain a product. The cleaned product is dried in an oven at 105° C. for 12 hours, thereby obtaining the catalyst which is denoted as $NH_4$—$MnO_2$.

Example 4

3 g of $NH_4MnO_4$ is added into a 250 mL conical flask. 30 mL of deionized water is further added into the conical flask. Then the conical flask is placed into a water bath at a constant temperature of 80° C. while the substances in the conical flask are subjected to a magnetic stirring. After the $NH_4MnO_4$ solid is completely dissolved, 45 g of $CH_3OH$ and 40 mL of $(NH_4)_2SO_4$ solution having a concentration of 80 g/L are added into the conical flask, and then the magnetic stirring is continued for 24 hours. When the reaction is finished, the mixture in the conical flask is filtered, washed with deionized water, and then filtered again to obtain a solid product. The cleaned solid product is dried an oven at 105° C. for 12 hours, thereby obtaining the catalyst which is denoted as $NH_4$—$MnO_2$-4.

The catalyst prepared in Example 4 is characterized by an electron microscope and an X-ray diffraction (XRD) analysis. It is found that the catalyst is birnessite-type manganese dioxide. The two catalysts in Example 4 and Example 3 have similar morphologies and compositions. Moreover, in catalyzing the ozone decomposition, the two catalysts in Example 4 and Example 3 have substantially the same catalytic activities and catalytic stabilities.

Comparative Example 1

3 g of $KMnO_4$ is added into a 250 mL conical flask. 100 mL of deionized water is further added into the conical flask. Then the conical flask is placed into a water bath at a constant temperature of 40° C., while the substances in the conical flask are subjected to a magnetic stirring. After the $KMnO_4$ solid is completely dissolved, 15 g of $CH_3OH$ is added into the conical flask, and then the magnetic stirring is continued for 6 hours. When the reaction is finished, the mixture in the conical flask is filtered, washed with deionized water, and then filtered again to obtain a solid product. The cleaned solid product is dried in an oven at 105° C. for 12 hours, thereby obtaining a catalyst which is a birnessite-type manganese dioxide and is denoted as $MnO_2$.

Comparative Example 2

3 g of $KMnO_4$ is added into a 250 mL conical flask. 60 mL of deionized water is further added into the conical flask, followed by adding 1.92 g of cetyltrimethylammonium chloride (CTAC) into the conical flask. The conical flask is then placed into a water bath at a constant temperature of 50° C. while the substances in the conical flask are subjected to a magnetic stirring. After all solids are completely dissolved, 1.5 ml of $CH_3OH$ is added into the conical flask, and then the magnetic stirring is continued for 6 hours. When the reaction is finished, the mixture in the conical flask is filtered, washed with deionized water, and then filtered again to obtain a solid product. The cleaned solid product is dried in an oven at 105° C. for 18 hours, thereby obtaining a catalyst which is denoted as $CTAC\text{-}MnO_2$.

FIGS. 2A and 2B are scanning electron microscope images of the catalyst prepared in Example 1 at different magnifications. It can be seen that sizes of the catalyst particles are relatively small, and the smaller particles are only about 50 nm. FIG. 2D is a transmission electron microscope image of the catalyst prepared in Example 1. It can be seen that the catalyst is in structure of small sheets which have a good dispersity. The structure of the small sheets is beneficial to increase the number of the catalytic active sites.

Figure 2D:
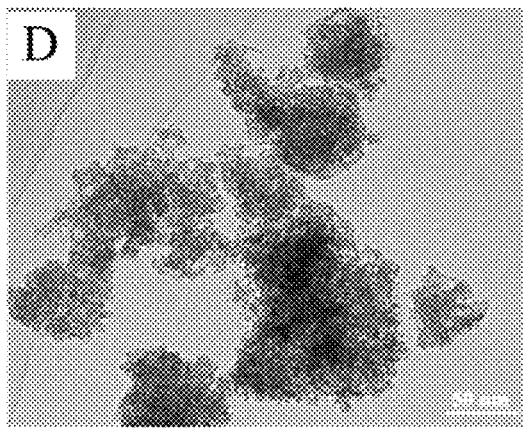
FIG. 2D is a transmission electron microscope image of the catalyst prepared in Example 1.
Figure 2E:
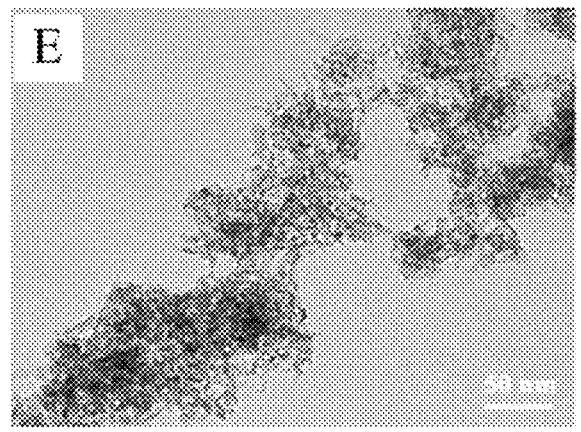
FIG. 2E is a transmission electron microscope image of the catalyst prepared in Example 2.

FIG. 2C is a scanning electron microscope image of the catalyst prepared in Example 2, from which the microstructure of the catalyst surface can be seen. It is found that the catalyst nanoparticle is formed by stacked sheets. The sheets at the surface of the catalyst are loosened, and the edges of the sheets are cracked, which is beneficial to produce oxygen vacancies. FIG. 2E is a transmission electron microscope image of the catalyst prepared in Example 2. It can be seen that the sheets of the catalyst are relatively thin and have a good dispersity, which is beneficial to increase the number of the catalytic active sites.

Figure 3:
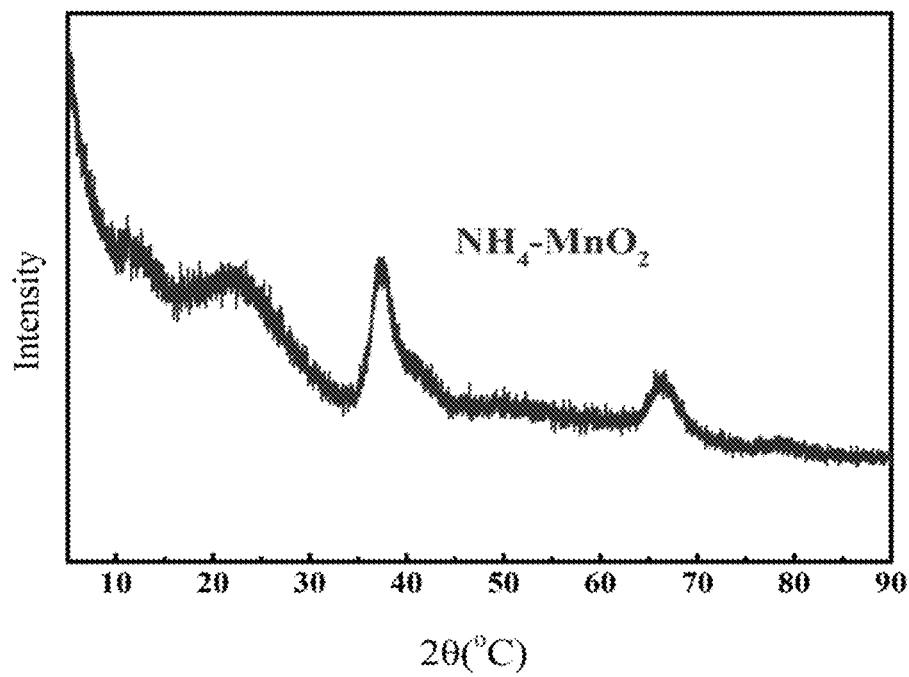
FIG. 3 shows an XRD pattern of a catalyst prepared in Example 3.

FIG. 3 is a XRD pattern of the catalyst prepared in Example 3. With reference to the XRD standard pattern (JCPDS 80-1098), the four diffraction peaks at 12.0°, 25.2°, 37.6°, 42.3°, and 66.5° are respectively corresponding to the {001}, {002}, {-111}, {-112}, and {005} planes of the birnessite-type manganese dioxide, suggesting that the catalyst is the birnessite-type manganese dioxide.

Figure 4:
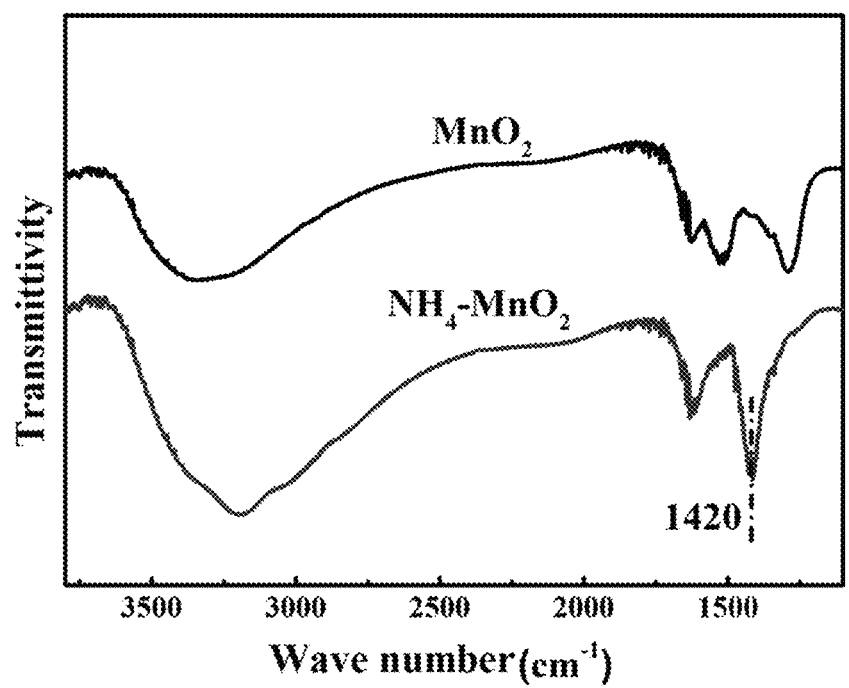
FIG. 4 shows an ATR-FTIR spectrum of the catalyst prepared in Example 3.

Referring to FIG. 4, the catalyst prepared in Example 3 is analyzed by Fourier Transform Infrared Spectroscopy equipped with an attenuated total reflection accessory (ATR-FTIR). A strong peak is found at 1420 $cm^{-1}$ which is consistent with $NH^{4+}$, suggesting that $NH^{4+}$ ions are adsorbed onto the surface of the catalyst.

Figure 5A:
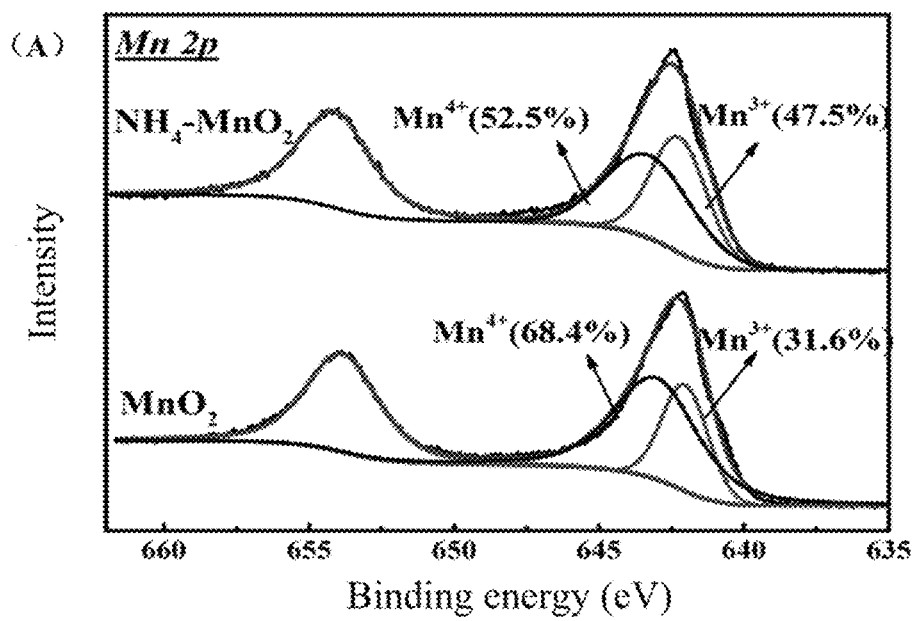
FIGS. 5A to 5D show XPS spectrums of the catalysts prepared in Example 3 and Comparative Example 1.
Figure 5B:
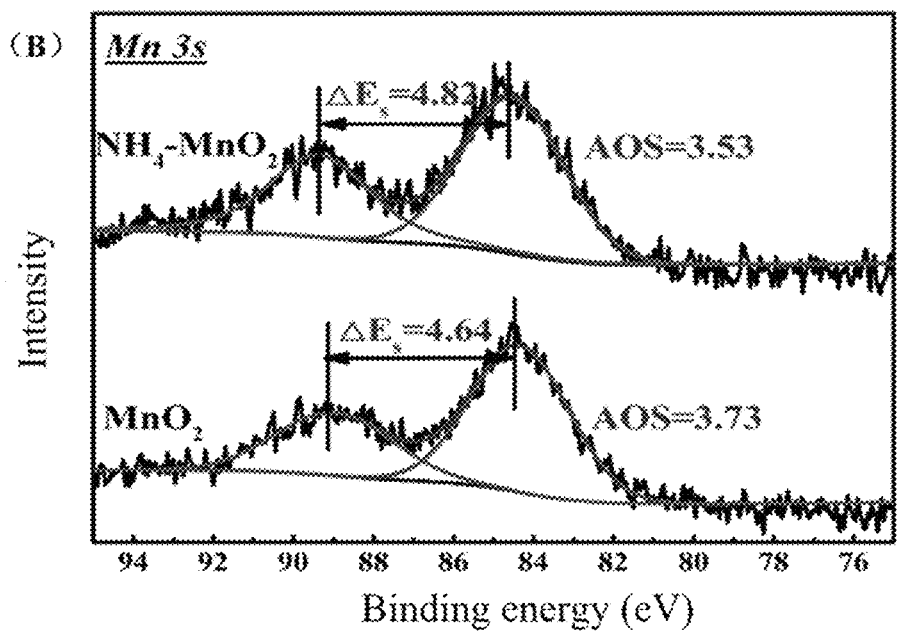
Figure 5C:
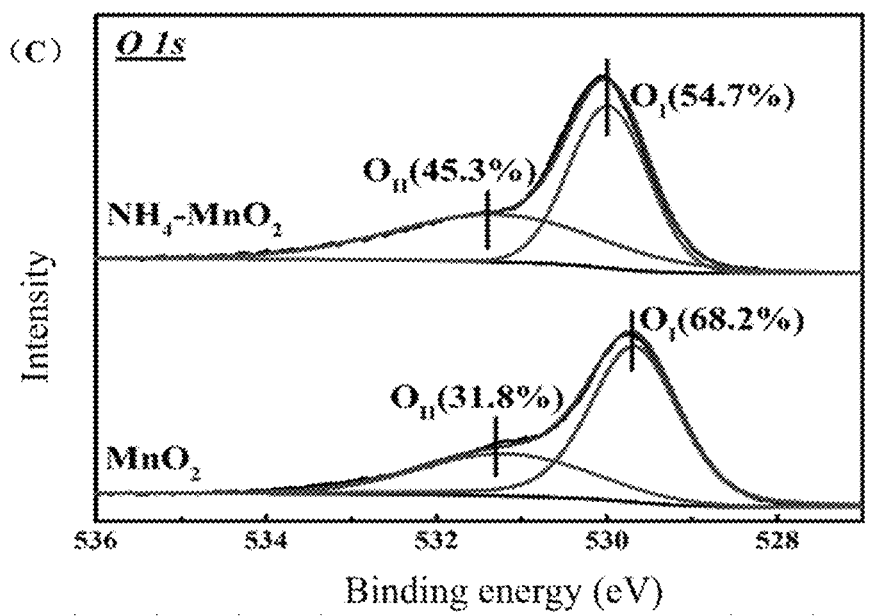
Figure 5D:
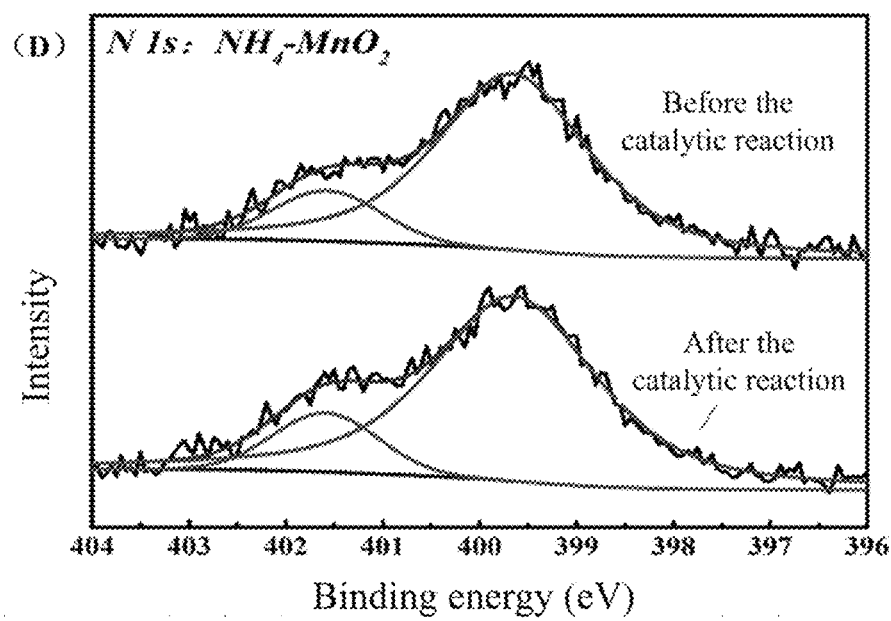

Referring to FIGS. 5A to 5D, the catalysts prepared in Example 3 and Comparative Example 1 are analyzed by X-ray photoelectron spectroscopy (XPS). FIGS. 5A to 5C respectively show Mn 2p, Mn 3s, and O 1s spectrums of the catalysts prepared in Example 3 and Comparative Example 1, from which it can be seen that the catalyst modified with the ammonium salt has more $Mn^{3+}$ ions, more oxygen species adsorbed on the surface, and decreased oxidation state, as compared to the catalyst not modified with the ammonium salt. All of those improve the activity of the catalyst. FIG. 5D shows N 1s spectrums of the catalyst $NH_4\text{—}MnO_2$ before and after a catalytic reaction. The catalyst $MnO_2$ has no N 1s spectrum. In FIG. 5D, the peaks at the binding energy of 401.7 eV belong to $NH^{4+}$. It is found that the peak corresponding to the element N is not changed before and after the catalytic reaction, suggesting that the $NH^{4+}$ ions are stably existed on the surface of the catalyst $NH_4\text{—}MnO_2$. The $NH^{4+}$ ions adsorbed on the surface of the catalyst increase the number of acid sites on the surface of the catalyst, thereby increasing the catalytic activity of the catalyst.

Ozone gas with a concentration of 196 $mg/m^3$ and a relative humidity of 60% continuously flows through 0.1 g of catalysts in particle sizes of 40 meshes to 60 meshes at a flow rate of 1 L/min to test the ozone decomposition efficiency of the catalysts. The catalysts are the catalyst prepared in Example 3, a commercially available ozone decomposing material, and the catalysts prepared in Comparative Examples 1 and 2, respectively.

Figure 6:
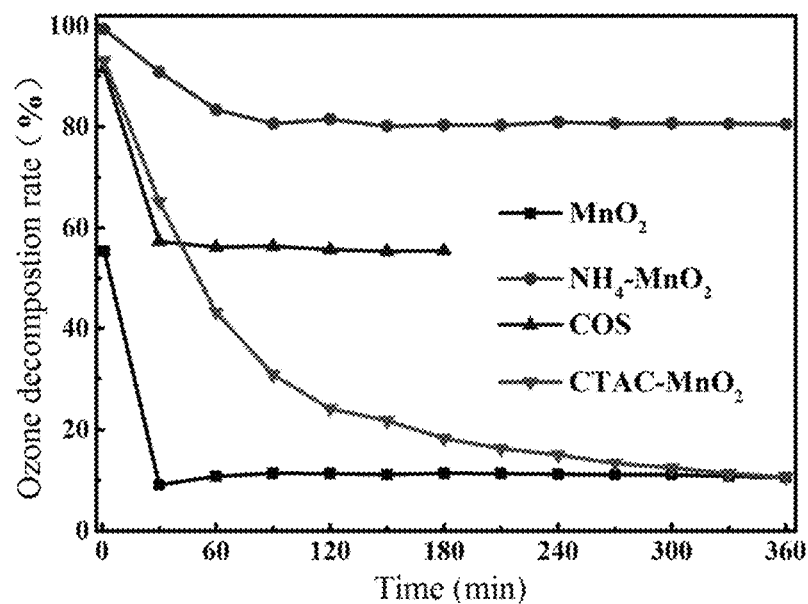
FIG. 6 shows ozone removing performances of different catalysts under the same condition.

The test results are shown in FIG. 6. It can be seen that an ozone removing efficiency of the catalyst $NH_4\text{—}MnO_2$ prepared in Example 3 reaches 100% at the beginning, then gradually decreases to 85%, and finally stably keeps at 85% in the following 5 hours reaction. While an ozone removing efficiency of the catalyst $MnO_2$ prepared in Comparative Example 1, i.e., the birnessite-type manganese dioxide not modified with the ammonium salt, is only about 10%. Moreover, it is found that an ozone removing efficiency of the commercially available ozone decomposing material (COS) is smaller than 60%, as compared to which the ozone removing efficiency of the catalyst $NH_4\text{—}MnO_2$ prepared in Example 3 is increased by 25%. In addition, by comparing the catalyst $NH_4\text{—}MnO_2$ prepared in Example 3 and the catalyst $CTAC\text{-}MnO_2$ prepared in Comparative Example 2, it is found that an ozone removing efficiency of the catalyst $CTAC\text{-}MnO_2$ prepared in Comparative Example 2 rapidly and continuously decreases and reaches 10% after 6 hours, suggesting that the birnessite-type manganese dioxide modified with the ammonium salt has a better catalytic activity and stability than the birnessite-type manganese dioxide modified with the quaternary ammonium salt.

Besides, by comparing the catalysts prepared in Examples 3 and 4, it is found that an ozone removing efficiency of the catalyst prepared in Example 4 is also stable at about 80%. The catalytic activities of the catalysts prepared in Examples 3 and 4 are similar and superior to those of the commercially available ozone decomposing material, the birnessite-type manganese dioxide not modified with the ammonium salt, and the birnessite-type manganese dioxide modified with the quaternary ammonium salt.

Therefore, the ammonium salt can significantly improve the catalytic performance of the birnessite-type manganese dioxide. An efficient and inactivation resistant ozone decomposition catalyst can be obtained by the modification with the ammonium salt solution.

Figure 7:
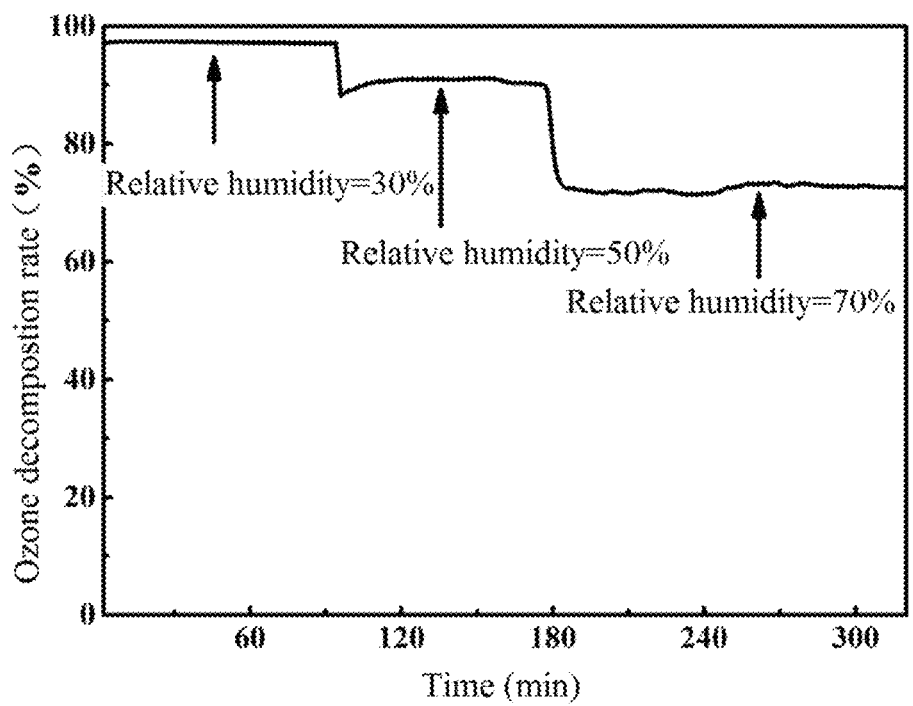
FIG. 7 shows ozone removing rates of the catalyst prepared in Example 3 at different humidities.

FIG. 7 shows ozone decomposition rates of the catalyst prepared in Example 3 when in continues contact with ozone gases with different humidities. The ozone decomposition rates of the catalyst prepared in Example 3 are stable at 97%, 91%, and 72% respectively under the conditions of 30%, 50%, and 70% of relative humidities.

Therefore, the catalyst made by the method of the present disclosure has a broad applicable humidity range for ozone decomposition.

Figure 8:
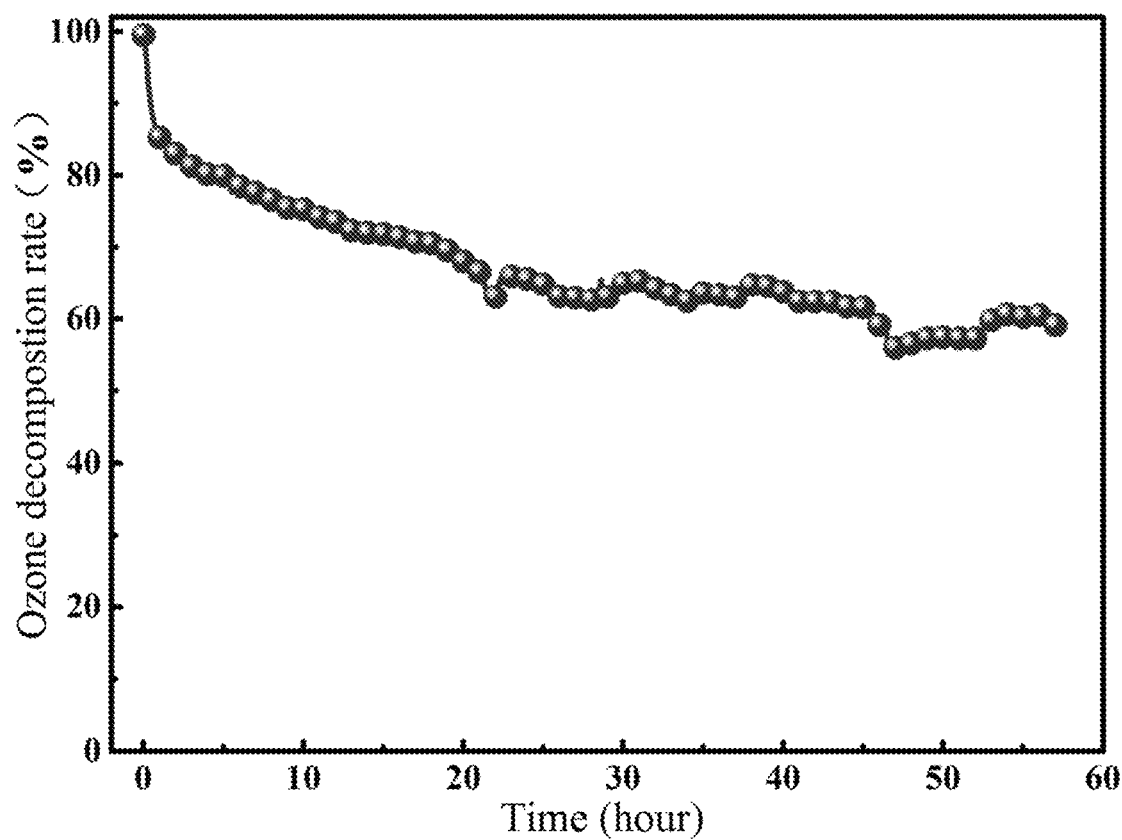
FIG. 8 shows a service life curve of the catalyst prepared in Example 3.

FIG. 8 is a service life curve of the catalyst prepared in Example 3 of the present disclosure. In the catalytic reaction for the ozone decomposition under the conditions of room temperature, ozone concentration of 196 $mg/m^3$, relative humidity of 60%, and air speed of 424413 $h^{-1}$, the catalyst exhibits a stable ozone decomposition ability in the first 24 hours. In the first 15 hours of the catalytic reaction, the ozone decomposition rate is larger than 70%. After the catalytic reaction for the ozone decomposition is continuously carried out for 60 hours, the ozone decomposition rate of the catalyst is still above 60%, suggesting that the catalyst prepared in the present disclosure has an excellent catalytic stability for the ozone decomposition.

The technical features of the above-described embodiments may be arbitrarily combined. In order to make the description simple, not all possible combinations of the technical features in the above embodiments are described. However, as long as there is no contradiction in the combination of these technical features, the combinations should be in the scope of the present disclosure.

What described above are only several implementations of the present disclosure, and these embodiments are specific and detailed, but not intended to limit the scope of the present disclosure. It should be understood by the skilled in the art that various modifications and improvements can be made without departing from the conception of the present disclosure, and all these modifications and improvements fall within the protection scope of the present disclosure. Therefore, the patent protection scope of the present disclosure is defined by the appended claims.

What is claimed is:

1. A method for making a catalyst for ozone decomposition, the method comprising:
    adding a reducing agent into a water solution of a permanganate salt to obtain a first reaction liquid, and heating the first reaction liquid under continuous stirring to form a birnessite-type manganese dioxide; and
    adding the birnessite-type manganese dioxide into a water solution of an ammonium salt to obtain a second reaction liquid, and heating the second reaction liquid under continuous stirring to form the catalyst.

2. The method of claim 1, wherein the ammonium salt is selected from the group consisting of ammonium sulfate, ammonium chloride, ammonium nitrate, ammonium carbonate, ammonium bicarbonate, and any combination thereof.

3. The method of claim 1, wherein a concentration of the ammonium salt in the water solution of the ammonium salt is about 5 g/L to about 400 g/L.

4. The method of claim 1, wherein a heating temperature of the first reaction liquid is about 25° C. to about 90° C.

5. The method of claim 1, wherein the permanganate salt is selected from the group consisting of potassium permanganate, sodium permanganate, ammonium permanganate, and any combination thereof.

6. The method of claim 1, wherein a concentration of the permanganate salt in the water solution of the ammonium salt is about 0.1 g/L to about 100 g/L.

7. The method of claim 1, wherein a mass ratio of the reducing agent to the permanganate is about 0.4 to about 15.

8. The method of claim 1, wherein the reducing agent is selected from the group consisting of methanol, ethanol, ethylene glycol, and any combination thereof.

9. The method of claim 1, wherein a heating temperature of the second reaction liquid is about 25° C. to about 90° C.

10. The method of claim 1, further comprising:
    filtering, washing, and/or drying the birnessite-type manganese dioxide at least once after the heating the first reaction liquid under continuous stirring to form the birnessite-type manganese dioxide.

11. The method of claim 1, further comprising:
    drying the catalyst at a temperature of about 60° C. to about 300° C. after the heating the second reaction liquid under continuous stirring to form the catalyst.

12. The method of claim 1, wherein the temperature of the drying is about 100° C. to about 150° C.

13. A method for making a catalyst for ozone decomposition, the method comprising:
    adding an ammonium salt and a reducing agent into a water solution of a permanganate salt to obtain a mixed solution, and then heating the mixed solution under continuous stirring to obtain the catalyst.

14. The method of claim 13, wherein the ammonium salt is selected from the group consisting of ammonium sulfate, ammonium chloride, ammonium nitrate, ammonium carbonate, ammonium bicarbonate, and any combination thereof.

15. The method of claim 13, wherein a heating temperature of the mixed solution is about 25° C. to about 90° C.

16. The method of claim 13, wherein the permanganate salt is selected from the group consisting of potassium permanganate, sodium permanganate, ammonium permanganate, and any combination thereof.

17. The method of claim 13, wherein a mass ratio of the reducing agent to the permanganate salt is about 0.4 to about 15.

18. The method of claim 13, wherein a concentration of the permanganate salt in the water solution of the permanganate salt is about 0.1 g/L to about 100 g/L and a concentration of the ammonium salt in the mixed solution is about 5 g/L to about 400 g/L.

19. The method of claim 13, further comprising:
    drying the catalyst at a temperature of about 100° C. to about 150° C. after the heating the mixed solution under continuous stirring to obtain the catalyst.

* * * * *